United States Patent
Jehan (10) Patent No.: US 10,025,786 B2
(45) Date of Patent: Jul. 17, 2018

(54) EXTRACTING AN EXCERPT FROM A MEDIA OBJECT

(71) Applicant: SPOTIFY AB, Stockholm (SE)

(72) Inventor: Tristan Jehan, Brooklyn, NY (US)

(73) Assignee: SPOTIFY AB, Stockholm (SE)

( * ) Notice: Subject to any disclaimer, the term of this patent is extended or adjusted under 35 U.S.C. 154(b) by 447 days.

(21) Appl. No.: 14/716,334

(22) Filed: May 19, 2015

(65) Prior Publication Data

US 2016/0342594 A1    Nov. 24, 2016

(51) Int. Cl.
G06F 17/30 (2006.01)
G06F 7/36 (2006.01)

(52) U.S. Cl.
CPC .......... G06F 17/30038 (2013.01); G06F 7/36 (2013.01); G06F 17/3002 (2013.01); G06F 17/30743 (2013.01); G06F 17/30787 (2013.01); G06F 17/30843 (2013.01)

(58) Field of Classification Search
CPC .............................................. G06F 17/30038
USPC ........................................................ 707/752
See application file for complete search history.

(56) References Cited

U.S. PATENT DOCUMENTS

| | | | |
|---|---|---|---|
| 7,842,874 B2 | 11/2010 | Jehan | 84/609 |
| 8,073,854 B2 * | 12/2011 | Whitman | G06F 17/30743 707/749 |
| 8,280,539 B2 | 10/2012 | Jehan | 700/94 |
| 2008/0065359 A1 * | 3/2008 | Rudolph | G06F 7/49989 703/2 |
| 2014/0338515 A1 | 11/2014 | Sheffer et al. | 84/609 |

OTHER PUBLICATIONS

Nieto et al., "Convex Non-Negative Matrix Factorization for Automatic Music Structure Identification", Acoustics, Speech and Signal Processing (ICASSP), 2013 IEEE Int'l Conf., Vancouver, BC, May 26-31, 2013, pp. 236-240.
Jehan et al., "Analyzer Documentation", The Echo Nest Corp.; Analyzer Version: 3.2; pp. 1-6, Jan. 7, 2014.
Int'l Search Report and the Written Opinion issued in connection with Int'l Appln. No. PCT/US2016/031466 dated Aug. 29, 2016.
Bartsch, et al., "Audio Thumbnailing of Popular Music using Chroma-Based Representations", IEEE Transactions on Multimedia, vol. 7, No. 1; pp. 96-104, (Feb. 2005).

* cited by examiner

Primary Examiner — Chelcie Daye
(74) Attorney, Agent, or Firm — Merchant & Gould P.C.

(57) ABSTRACT

An excerpt of a media object is extracted by computing, for each bar of an N-bar loop, one or more perceptual quality vectors. For each of the one or more perceptual quality vectors within a search zone (S), one or more distances between bar i and bar i+N is computed and sorted to generate a sorted list of bars.

10 Claims, 5 Drawing Sheets

EXTRACTING AN EXCERPT FROM A MEDIA OBJECT

BACKGROUND OF THE INVENTION

Field of the Invention

This disclosure relates generally to media content object processing systems and methods, and more particularly to extracting an excerpt from a media object.

Description of Related Art

Media devices, such as digital video and audio players, can include multiple capabilities, such as playing stored or streamed content, browsing and selecting from recorded content, storing and/or receiving content selected by a user, and the like. In this connection, the term "media object" means any kind of media content, such as an audio, video or audio-visual item.

One such capability of such video and audio players is media object preview which provides an excerpt taken from a media object through the digital video or audio player. Typical mechanisms for extracting excerpts from media objects involve extracting a portion of the original media object using a fixed ratio of the total duration of the media object. However, current media systems, devices and services provide inadequate previews.

One problem with existing previews is that they do not capture a portion of the media object that can be used as a proxy for what might be considered the most exciting, representative, or interesting section of the media object. One technical challenge in extracting such excerpts from the media content involves determining the most relevant portions of it without requiring human input. It is desirable, therefore, to provide systems and methods that analyze media objects and select such excerpts.

A loop is a repeating section of audio or visual material, which can be used for a variety of purposes. Short sections of material can be repeated to create, for example, ostinato patterns.

A loop can be created using a wide range of media technologies. One shortfall of existing technologies is that they do not have the ability to generate a loop using audio analysis in a manner that provides the most exciting, representative, or interesting section of the media object.

BRIEF DESCRIPTION

The example embodiments described herein provide systems, methods and computer products for extracting an excerpt from a media object by computing, for each bar of an N-bar loop, one or more perceptual quality vectors, where N is an integer. Computing is provided, for each of the one or more perceptual quality vectors within a search zone (S), one or more distances between bar i and bar i+N, correspondingly, where i is an integer, and sorting the one or more distances between bar i and bar i+N to generate a sorted list of bars.

In one example embodiment, the sorting can also include the step of removing, for each of the one or more perceptual quality vectors, a predetermined number of bars from the sorted list of bars. Alternatively, the sorting can be provided by weighting the one or more distances generated by weighting each of the one or more distances between bar i and bar i+N, and accumulating the weighted distances.

In yet another embodiment the method includes detecting a repetition of the N-bar loop within the search zone (S).

Figure 2:
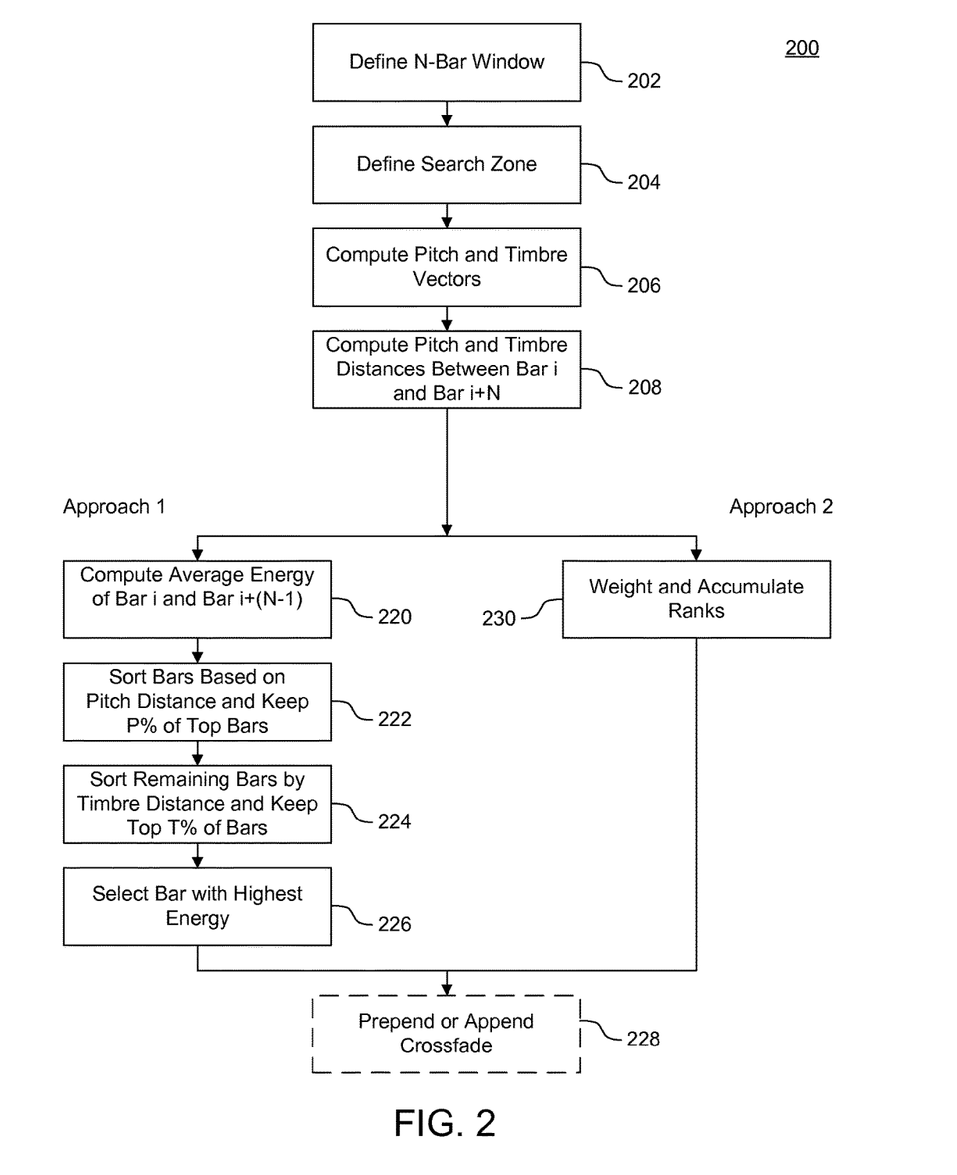
FIG. 2 illustrates a flowchart for extracting an excerpt from a media object in accordance with an example embodiment.

In another embodiment, the method includes providing a crossfade between at least one section of the N-bar loop, wherein the crossfade has a crossfade length (D). The crossfade can be provided by prepending the crossfade to the starting section of the N-bar loop at $T_0-D$, where $T_0$ is the time onset of a first beat of the N-bar loop, as shown in block 228.

In an example embodiment, the one or more perceptual quality vectors include a pitch vector, a timbre vector and an energy vector.

The search zone (S) is based on a duration of the media object ($T_D$), a predetermined introduction section (S1), and an outro section (S2), wherein $S=T_D-S1-S2$.

In yet another embodiment, the crossfade can be appended to the ending section of the N-bar loop at $T_N-D$, where $T_N$ is the time onset of the Nth beat of the N-bar loop.

In another embodiment, the crossfade is an equal-power of a fade-in and a fade-out which, in turn, can be followed by a limiter.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments described herein provide systems, methods and computer products for extracting an excerpt from a media object, which are now described herein in terms of an example system for extracting an excerpt from a media object and using the excerpt to generate a loop. The loop can be used as a preview or a repeating section (e.g., a loop) of the media content on the media object. This description is not intended to limit the application of the example embodiments presented herein. In fact, after reading the following description, it will be apparent to one skilled in the relevant arts) how to implement the following example embodiments in alternative embodiments e.g., involving any media object from which an excerpt can be extracted, such as an audio or video object.

Figure 1:
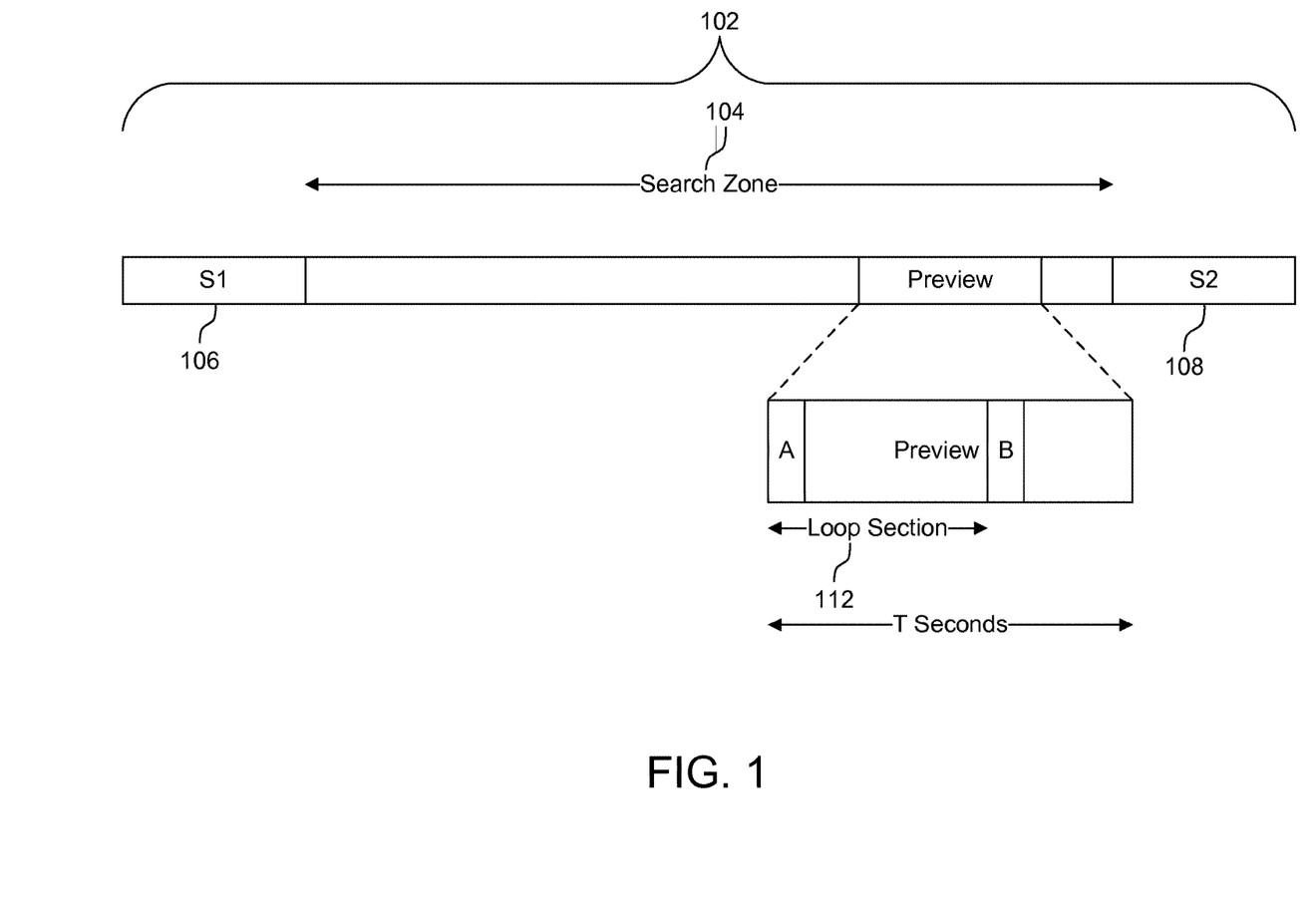
FIG. 1 illustrates a media object having a search zone from which a loop section is extracted in accordance with an example embodiment.

FIG. 1 illustrates a media object 102 having a search zone 104 from which a loop section 112 is extracted in accordance with an example embodiment. FIG. 2 is a flowchart illustrating a process 200 for extracting an excerpt from the media object 102 in accordance with an example embodiment.

Prior to performing process 200, an acoustic analysis is performed on the media object 102 to provide acoustic analysis data that describes the structure and musical content of the media object. In one embodiment, the acoustic analysis data includes pitch, timbre, and energy. The acoustic analysis mechanism takes a digital audio file, for example, from disk, (e.g. mp3, m4a, way, aif, mov, mpeg, fly), or audio data piped in on a command line and generates a file (e.g., JSON-formatted text file) that describes the structure and musical content of the media object. In addition to pitch, timbre and energy, the acoustic analysis data can also include sections, downbeats, rhythm, and the like.

In an example embodiment, the mechanism that performs the acoustic analysis incorporates principles of psychoacoustics, music perception, and adaptive learning to model both the physical and cognitive processes of human listening to output a description of attributes such as musical events, structures, and global attributes such as key, loudness, time signature, tempo, beats, sections, harmony, and the like.

It should be understood that other presently known or future acoustic analysis data processor or processing techniques can be used to obtain such acoustic analysis data.

Referring to FIGS. 1 and 2, in block 202 an N-bar window corresponding to N-bar loop 112 is defined and in block 204 a search zone 104 is defined. How the N-bar loop is defined will now be described in more detail.

For a time signature A/B where B is a numeral indicating a note value that represents one beat (the beat unit) and A is a numeral indicating how many such beats are grouped together in a bar, the length of a sliding window is computed according to the equation N×A, where N is the number of bars. In this example, the sliding window is the same length as the loop section 112.

In one example implementation, N is selected empirically based on the desired length of the loop and the phrasing of the media content being processed. Popular music, for example, progresses in phrase lengths that are multiples of two (2) bars and have a 4/4 time signature. Thus, in the case where the tempo is 56 beats per minute (bpm), to obtain an approximately 30 second loop, in this example implementation N is set to eight (8). For a 4/4 time signature, for example, the sliding window would therefore be 8×4=32-beats long. An 8-bar loop would thus reach approximately 30 seconds when the tempo is 56 bpm.

In order to achieve a loop that is within 30 seconds, where the bpm is lower than 56 bpm, e.g., 40 bpm, fewer bars are needed (e.g., 4 bars).

In the case where a longer loop is desired, the length of the N-bar window would be adjusted accordingly. The faster the tempo, the shorter the loop. Thus, if the tempo is faster such that the loop would be, for example 10 seconds long using a 4-bar window, the length of the N-bar window would be increased to obtain a longer loop, for example, to 16 bars.

Search zone 104 is defined as the duration of the media object 102 minus an introduction section (S1) 106 and an outro section (S2) 108. In one embodiment, search zone 104 is defined as the duration of the media object 102 minus an introduction section (S1) 106 that is n % beats of the media object 102, and an outro section (S2) 108 that is m % beats of the track 102, e.g. n=25, and m=33. The values of n and m determine the extent to which the introduction and outro are cut out. In one embodiment, these values are selected empirically.

In another embodiment, n and m can be determined by performing a sectional analysis, for example, by determining any relatively dramatic variations of the media content in time. For example, a sectional audio analysis can be performed on the media object to determine changes in chorus, start of a verse, a bridge, and the like.

Referring again to FIG. 2, after an N-bar window and search zone are defined (blocks 202 and 204), for every bar in the search zone 102, a pitch vector representation of the bar and a timbre vector representation of the bar are computed, as shown in block 206.

An m-dimensional pitch vector can be computed, for example, based on chromas and beats, where m equals the number of chromas multiplied by the number of beats per bar, e.g., 12 chromas×4 beats=a 48-dimensional pitch vector. An n-dimensional timbre vector representation of the bar can be computed, for example, based on the number of timbre coefficients and number of beats, where n equals the number of timbre coefficients times the number of beats per bar, e.g., 12 timbre coefficients×4 beats=a 48-dimensional timbre vector.

Moving one bar at a time, the distance (d) between sections of bars, that is, between bar i and bar i+N (e.g., N=8, i=1, 2, . . . , N) for both pitch and timbre are computed, as shown in block 208. This is accomplished, for example, by determining the Euclidean distance or cosine distance between bar i and bar i+N.

In one embodiment, labeled in FIG. 2 as "Approach 1," the average energy of the section bar i to bar i+(N−1) is computed (e.g., for N=8 bars; i=1, 2, . . . , N), as shown in block 220. This is performed, for example, by averaging the energies of every segment within the section.

In turn, the bars are sorted by pitch distance in increasing order, and P % of the top bars are retained, e.g. 50%, as shown in block 222. That is, only the bars that have the closest pitch content similarity to bar+N (e.g., N=8) are kept. P is selected based on how much of a filtering weight is given to pitch (also referred to as a "pitch filtering weight"). When P is high, pitch has a lower filtering weight. Most of the potential loops having a high P would thus remain and only the lower ranked ones would be filtered out.

The remaining bars are sorted by timbre distance in increasing order, and T % of the top bars are retained, e.g. 50%, as shown in block 224. That is, only the bars that have the closest timbre content similarity to bar+N (e.g., N=8) are kept (e.g., 25% of the bars remain). T is selected based on how much of a filtering weight is given to timbre (also referred to as a "timbre filtering weight"). When T is high, timbre has a lower filtering weight. Most of the potential loops having a high T would thus remain and only the lower ranked ones would be filtered out.

In one embodiment, the percentages of pitch and timbre, respectively, (P % and T %) can be selected based on certain assumptions. For example, P and T can be selected based on the genre of the media object. In the case of classical music, on one hand, pitch may matter more than timbre. In the case of techno music, on the other hand, timbre may matter more than pitch.

In block 226, using the average energy of the bars within the loop, the bar with the highest energy (i.e., the section bar i to bar i+7 with highest average energy) is selected from among the remaining sections of the media object.

In one example embodiment, the most energetic remaining N bars (e.g., N=8) are utilized to capture from the media object the media content of interest.

In an alternative approach, labeled in FIG. 2 as "Approach 2," instead of selecting the top N bars as in Approach 1 (described above), the ranks are weighted and accumulated instead, e.g., FinalRank=C1×RankTimbre+C2×RankPitch+C3×RankEnergy, where Ci are weight coefficients, where "i" is an integer, as shown in block 230. In this embodiment, instead of determining the pitch, timbre and energy ranking of the top N bars in sequence, the pitch, timbre and energy vectors are combined and the processed bars are ranked based on the weighting of the vectors. Coefficients C1, C2, and C3 can be optimized based on a statistical analysis of several tracks, using for example, a neural network that learns based on loops that have been predetermined to be exemplary (i.e., relatively ideal) loops. By analyzing several loops, the coefficients of ideal loops can be extrapolated to a test media object.

Once the N-bar loop (e.g., N=8) has been found according to one of the above-described approaches, the corresponding portion of the media object is extracted.

Figure 3:
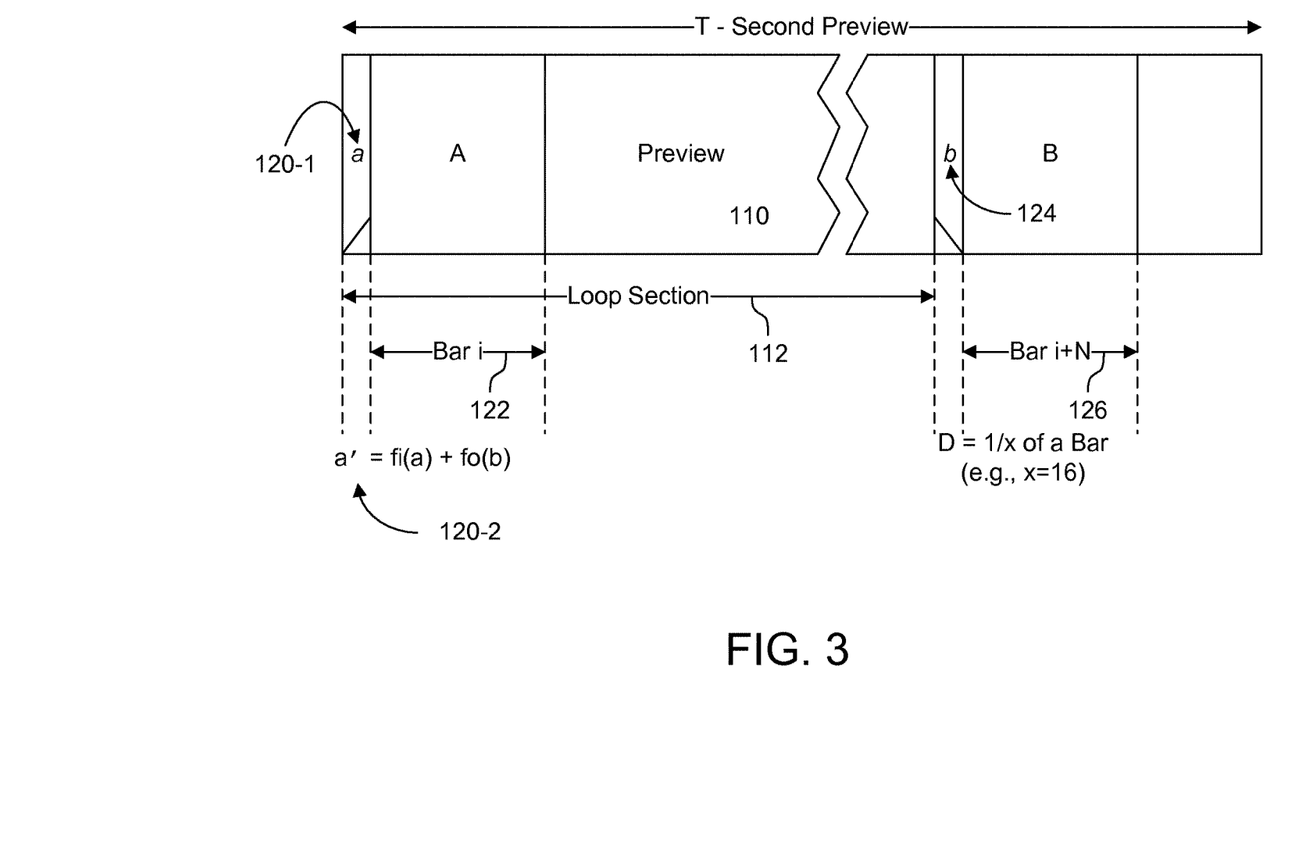
FIG. 3 illustrates a preview of a media object in accordance with an example embodiment.

FIG. 3 is a preview of duration T (e.g., T=30 seconds) in accordance with an example embodiment.

To provide smooth transitions when looping, a preview 110 is prepended with a crossfade b 124 having a length D (e.g., D=a quarter of a beat long or 1/16 of a bar) between section A 122 and section B 126 where section A 122 is the section starting at $T_0$–D (with $T_0$ being the time onset of the first beat of the loop section 112) and section B 126 the section starting at $T_N$–D 124 (with $T_N$ being the time onset of the (N+1)th bar; e.g., where N=8 and N+1=the $9^{th}$ bar). The loop end point is thus $T_N$–D (e.g., $T_8$–D).

A crossfade a' 120-2 is generated to overwrite original a 120-1 by combining the original a 120-1 with the original b 124. For example, the crossfade a' 120-2 can be an equal-power sum of a fade-in of the original a 120-1 (e.g., $f_i(a)$) plus a fade-out of original b 124 ($f_o(b)$) followed by an audio limiter. This ensures that sample $T_N$–D is equal to sample $T_0$–D, and that looping is unnoticeable without requiring any processing work on the client side. This also allows for implementation of a circular buffer from ($T_0$–D) to ($T_N$–D), i.e. of duration $T_N$–$T_0$, for storing the loop.

The crossfade a' 120-2 can then be prepended in place of the original a 120-1.

In an example embodiment, at playback, the prepended crossfade a' 120 can be skipped the first time the loop is played.

The audio samples are, in turn, extracted from $T_0$–D to $T_0$–D+T to obtain a second preview of duration T (e.g., T=30 seconds), and the corresponding metadata can be attached to the header of the compressed audio file, e.g., mp3, including preview onset 0=$T_0$–D, loop point position L=($T_N$–D)−($T_0$–D), duration D, beat locations, downbeat location, and the like.

Previews can be named after their parent track (e.g. <track_ID>_preview), the analysis data of which can be retrieved via a track application programming interface (API). The full data analysis can be downloaded for the parent track and the preview time onset can be used to select the related preview data analysis from the full analysis.

Figure 4:
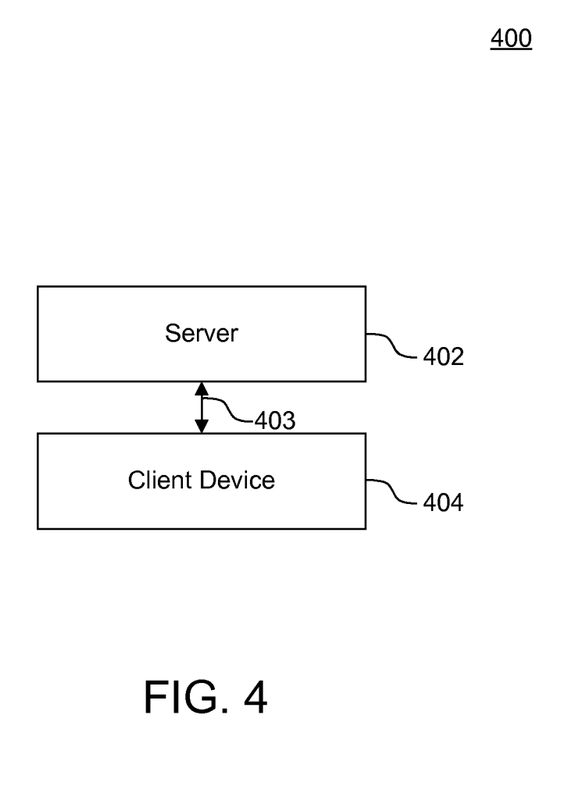
FIG. 4 is a block diagram of an example client-server data system configured in accordance with the principles of the invention.

In one embodiment, the above-described approach implements one pass through the analysis data. In another example implementation, a self-similarity analysis can be performed on the media object in order to detect actual section repetitions, e.g. the chorus. Section boundaries can then be used to start the preview at the onset of a musical pattern or phrase: e.g. the strict beginning of the chorus. FIG. 4 is a block diagram of an example client-server data system 400 configured in accordance with the principles of the invention. Data system 400 can include server 402 and client device 404. In some embodiments, data system 400 can include multiple servers 402, multiple client devices 404, or both multiple servers 402 and multiple client devices 404. For simplicity, only one server 402 and one client device 404 are illustrated.

Server 402 may include any suitable types of servers that can store and provide data to client device 404 (e.g., file server, database server, web server, or media server). Server 402 can store media objects and other data (e.g., metadata associated with the content of the media objects), and server 402 can receive data download requests from client device 404. For example, server 402 can receive requests to obtain the media objects, such as one or more audio or video tracks or previews or loops of those audio or video tracks such as those described above. Responsive thereto, server 402 can locate and provide the requested songs, previews or loops as well as associated metadata, such as attributes related to the media object (e.g., genre, artist, album title, album cover art, release date, and the like), media recommendations, and the like.

In some embodiments, server 402 can obtain and process data from one or more client devices 404. For example server 402 can receive from claim device 404 requests for specific previews or loops.

Server 402 can communicate with client device 404 over communications link 403. Communications link 403 can include any suitable wired or wireless communications link, or combinations thereof, by which data may be exchanged between server 402 and client 404. For example, communications link 403 can include a satellite link, a fiber-optic link, a cable link, an Internet link, or any other suitable wired or wireless link. Communications link 403 may enable data transmission using any suitable communications protocol supported by the medium of communications link 403. Such communications protocols may include, for example, Wi-Fi (e.g., a 802.11 protocol), Ethernet, Bluetooth™ radio frequency systems (e.g., 900 MHz, 2.4 GHz, and 5.6 GHz communication systems), infrared, TCP/IP (e.g., and the protocols used in each of the TCP/IP layers), HTTP, BitTorrent, FTP, RTP, RTSP, SSH, any other communications protocol, or any combination thereof.

Client device 404 can include any electronic device capable of playing audio or video (e.g., music, videos, podcasts, and interviews) to a user and may be operative to communicate with server 402. For example, client device 404 can include a portable media player, a cellular telephone, pocket-sized personal computers, a desktop computer, a laptop computer, and any other device capable of communicating via wires or wirelessly (with or without the aid of a wireless enabling accessory device).

Figure 5:
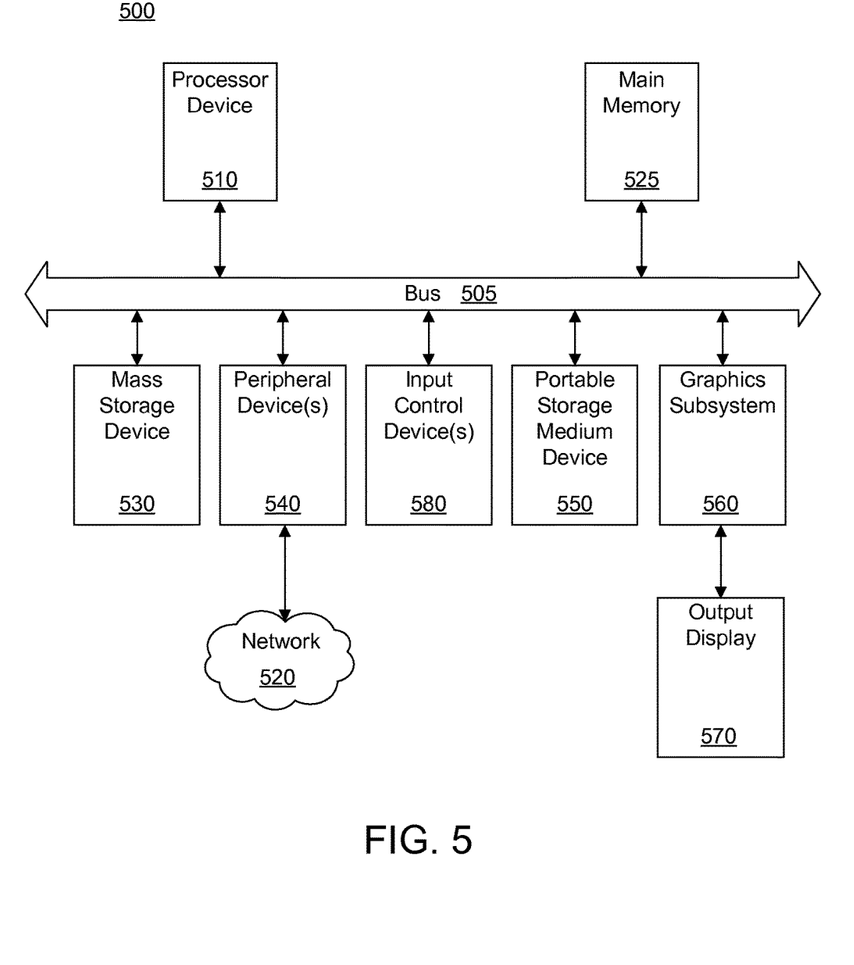
FIG. 5 is a block diagram of a general and/or special purpose computer, which may be a general and/or special purpose computing device, in accordance with some of the example embodiments of the invention.

FIG. 5 is a block diagram of a general and/or special purpose computer 500, which may be a general and/or special purpose computing device, in accordance with some of the example embodiments of the invention. The computer 500 may be, for example, the same or similar to client device (e.g., 404, FIG. 4), a user computer, a client computer and/or a server computer (e.g., 402, FIG. 4), among other things, or can be a device not operative to communicate with a server.

The computer 500 may include without limitation a processor device 510, a main memory 525, and an interconnect bus 505. The processor device 510 may include without limitation a single microprocessor, or may include a plurality of microprocessors for configuring the computer 500 as a multi-processor system. The main memory 525 stores, among other things, instructions and/or data for execution by the processor device 510. The main memory 525 may include banks of dynamic random access memory (DRAM), as well as cache memory.

The computer 500 may further include a mass storage device 530, peripheral device(s) 540, portable non-transitory storage medium device(s) 550, input control device(s) 580, a graphics subsystem 560, and/or an output display interface 570. For explanatory purposes, all components in the computer 500 are shown in FIG. 5 as being coupled via the bus 505. However, the computer 500 is not so limited. Devices of the computer 500 may be coupled via one or more data transport means. For example, the processor device 510 and/or the main memory 525 may be coupled via a local microprocessor bus. The mass storage device 530, peripheral device(s) 540, portable storage medium device(s) 550, and/or graphics subsystem 560 may be coupled via one or more input/output (I/O) buses. The mass storage device 530 may be a nonvolatile storage device for storing data and/or instructions for use by the processor device 510. The mass storage device 530 may be implemented, for example, with a magnetic disk drive or an optical disk drive. In a software embodiment, the mass storage device 530 is configured for loading contents of the mass storage device 530 into the main memory 525.

The portable storage medium device 550 operates in conjunction with a nonvolatile portable storage medium, such as, for example, a compact disc read only memory (CD-ROM), to input and output data and code to and from the computer 500. In some embodiments, the software for storing information may be stored on a portable storage medium, and may be inputted into the computer 500 via the portable storage medium device 550. The peripheral device (s) 540 may include any type of computer support device, such as, for example, an input/output (I/O) interface configured to add additional functionality to the computer 500. For example, the peripheral device(s) 840 may include a network interface card for interfacing the computer 500 with a network 520.

The input control device(s) 580 provide a portion of the user interface for a user of the computer 500. The input control device(s) 580 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 500 may include the graphics subsystem 560 and the output display 570. The output display 570 may include a display such as a CSTN (Color Super Twisted Nematic), TFT (Thin Film Transistor), TFD (Thin Film Diode), OLED (Organic Light-Emitting Diode), AMOLED display (Active-matrix organic light-emitting diode), and/or liquid crystal display (LCD)-type displays. The displays can also be touchscreen displays, such as capacitive and resistive-type touchscreen displays.

The graphics subsystem 560 receives textual and graphical information, and processes the information for output to the output display 570.

Each component of the computer 500 may represent a broad category of a computer component of a general and/or special purpose computer. Components of the computer 500 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Input control devices 580 can control the operation and various functions of computer 500. For example, input control devices 580 can identify songs or previews or loops of songs to play through a peripheral device 540 such as audio, video or network devices.

As described in detail above, input control devices 580 can control the components of computer 500 to provide a preview of music in accordance with the principles of the invention. Input control devices 580 can include any components, circuitry, or logic operative to drive the functionality of computer 500. For example, input control device(s) 580 can include one or more processors acting under the control of an application.

In some embodiments, the server, 402, client device 404 or computer 500 constructed in accordance with the techniques described herein can allow the user to control the progression of the scan preview, for example by enabling a user to control the length of time that each preview or loop is played, or how a preview or loop is mixed or crossfaded.

The example embodiments described herein can be applied to previewing media objects such as an audio object. In one example embodiment, previews that capture a "hook" of a song as a proxy for what might be considered the most exciting, representative, or interesting section of the song are provided. Such preview can include the chorus or the most repeated and memorable melody, riff or pattern.

Such previews can also include looping data points, so that a sub-section of a sample (e.g., 30 second sample) can be looped seamlessly and indefinitely on an electronic device, e.g. the singing-along end of the Beatles' song "Hey Jude". Finally, additional analysis data is also attached to the header of a preview for convenience, e.g., beats, downbeats, onset time of the preview in its original track, and the like.

In an example embodiment, a relevant section at the beginning of the media object is extracted. For example, the section of an audio track from the onset of what could be the first lyrics, or the initial energetic pattern, post-intro, e.g., when the drums come in with a significant beat, can be extracted. This allows the slower and/or softer, and less meaningful or representative introduction of a song, which may not allow a listener to get a quick and relevant assessment for the entire song, to be bypassed.

In another embodiment, as much content as possible is retained in order to let the user get a full listen of the song.

In another embodiment, the search zone can be constrained to only the beginning of the song, e.g. search only within the first 20% of the media object. Most of the same logic discussed above otherwise applies. In this example embodiment, however, smaller loops (e.g., 2 or 4 bars) can be used. In addition more weight can be placed on energy than actual "loopability" which can be less of a concern. Early bars can be weighted higher and heuristics applied to ensure that the section starts at the beginning of a musical pattern, e.g. the start of the first verse.

The disclosure provided herein can also be used for other applications. For example, with systems that provide interactive multi-touch interface for computer music exploration and collaboration, for looping audio seamlessly before reaching the end of a preview. Another useful application of the embodiments described herein includes attaching the loops to photos to add an infinite acoustic layer to the image, e.g. while visualizing Instagram photos. Yet another application could involve attaching the loops derived in accordance to the above embodiments to attached and synchronized to videos, such as those provided through video sharing services, to enhance the emotional content of a moment. Another application involves using the loops to create dynamic slideshows, where photos are synchronized to musical events, and the slideshows are made loopable.

Loops obtained using the embodiments described herein can also be used to quickly construct playlist previews, or scanning through radio channels, used to transition from one preview to another beat synchronously, or for providing remixes, mashups, and creating new music.

The loops can also be used for searching similar songs, by focusing on the small musical pattern rather than a summary of the entire song or used as a proxy for entire songs in various contexts and use cases.

What is claimed is:

1. A method for extracting an excerpt of a media object, comprising:
    computing, for each bar of an N-bar loop of a media object, one or more perceptual quality vectors, where N is an integer;
    computing, for each of the one or more perceptual quality vectors within a search zone (S), one or more distances between bar i and bar i+N, correspondingly, where i is an integer;
    sorting the one or more distances between bar i and bar i+N to generate a sorted list of bars; and
    extracting an excerpt from the media object based on the sorted one or more distances for at least one of playback and searching for content.

2. The method of claim 1, wherein the sorting includes the step of removing, for each of the one or more perceptual quality vectors, a predetermined number of bars from the sorted list of bars.

3. The method of claim 1, wherein the sorting includes the steps of:
    weighting the one or more distances by weighting each of the one or more distances between bar i and bar i+N; and
    accumulating the weighted distances.

4. The method of claim 1, further comprising the step of:
    detecting a repetition of the N-bar loop within the search zone (S).

5. The method according to claim 1, further comprising the step of:
    providing a crossfade between at least one section of the N-bar loop, wherein the crossfade has a crossfade length (D).

6. The method according to claim 5, wherein providing the crossfade includes:
    prepending the crossfade to the starting section of the N-bar loop at $T_0-D$, where $T_0$ is the time onset of a first beat of the N-bar loop.

7. The method according to claim 1, wherein the one or more perceptual quality vectors include a pitch vector, a timbre vector and an energy vector.

8. The method according to claim 1, wherein the search zone (S) is based on a duration of the media object ($T_D$), a predetermined introduction section (S1), and an outro section (S2), wherein $S=T_D-S1-S2$.

9. A non-transitory computer-readable medium having stored thereon one or more sequences of instructions for causing one or more processors to perform the methods in any one of claims 1-8.

10. A system comprising:
    one or more processors; and
    a computer-readable storage medium coupled to the one or more computer processors, the computer-readable storage medium comprising instructions stored thereon, wherein the instructions when executed by the one or more processors cause the one or more processors to perform the method in any one of claims 1-8.

* * * * *